July 3, 1962  G. F. SALISBURY  3,042,736
PROTECTIVE COVER
Filed Aug. 12, 1960
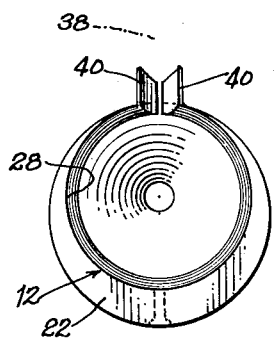
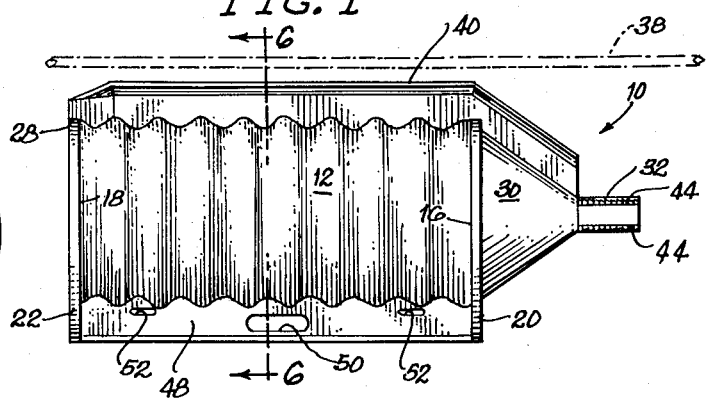
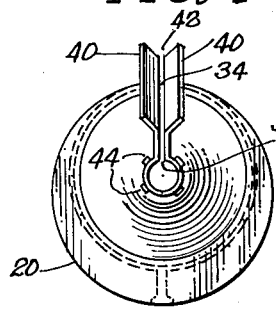
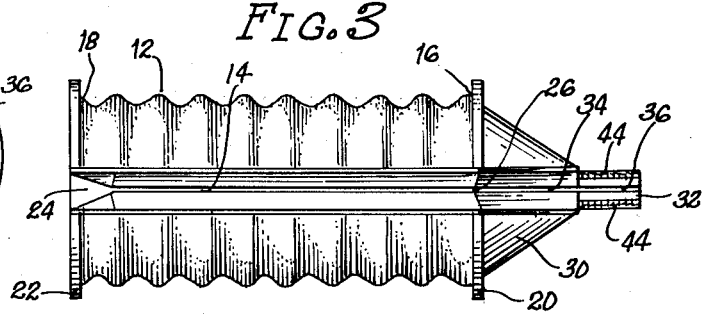
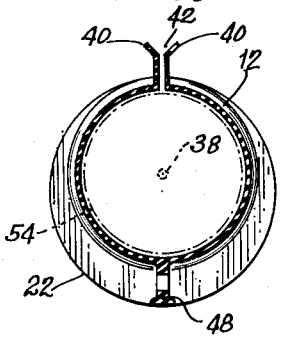
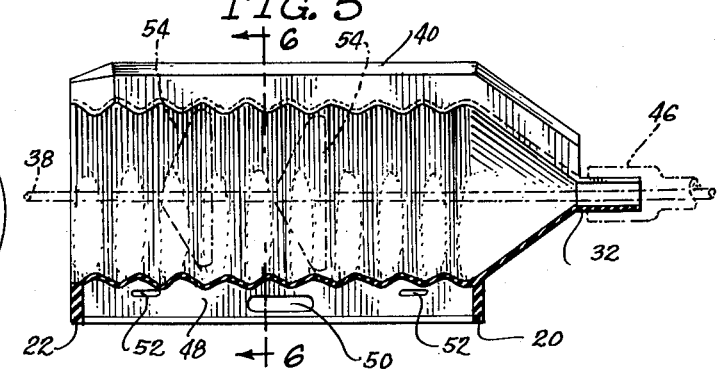
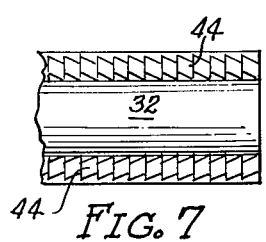
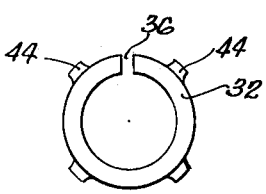
INVENTOR.
George F. Salisbury
BY Zabel, Baker, York,
Jones & Dithmas
Attorneys

United States Patent Office 3,042,736
Patented July 3, 1962

1

3,042,736
PROTECTIVE COVER
George F. Salisbury, Kenilworth, Ill., assignor to W. H. Salisbury & Co., Chicago, Ill., a corporation of Illinois
Filed Aug. 12, 1960, Ser. No. 49,268
11 Claims. (Cl. 174—5)

This invention relates to a protective cover, and more particularly to a lightweight protective cover of a size adapted to enclose high voltage electrical equipment such as large dead end bells, disconnect switches, large pin and post type insulators and the like.

For work on high voltage power lines it is necessary to protect the linemen by enclosing the adjacent wires, insulators, switches etc. with insulating protective covers.

Since some of the insulators and switches are large, it is desirable to provide covers which are lightweight and easy to apply and remove, usually with the aid of "hot stick" applicators. In addition, it is desirable for such protective covers to be easily attached to and removed from other protective covers by means of such applicators.

What is needed therefore, and among other things, comprises an important object of this invention, is a protective cover for electrical equipment on high voltage lines which can be easily, safely and removably installed.

A further object is to provide a lightweight, durable insulating cover which easily can be manipulated by a "hot stick" applicator.

Yet another object is to provide a large protective cover which can be interlocked detachably with smaller protective covers in order to enclose all wires and electrical equipment in the work area.

Other objects, advantages and details of the invention will be apparent as the description proceeds, reference being had to the accompanying drawing wherein one form of the invention is shown. It is to be understood that the description and drawing are illustrative only, and that the scope of the invention is to be measured by the appended claims.

FIG. 1 is a side elevational view of an improved protective cover embodying the invention.

FIG. 2 is a left end elevational view of the protective cover shown in FIG. 1.

FIG. 3 is a top view of the protective cover shown in FIG. 1.

FIG. 4 is a right end elevational view of the protective cover shown in FIG. 1.

FIG. 5 is a longitudinal sectional view of the improved protective cover.

FIG. 6 is a sectional view on the line 6—6 of FIG. 1.

FIG. 7 is an enlarged top view of the reduced extension on the protective cover.

FIG. 8 is an enlarged end view of the reduced extension showing the arrangement of the rows of serrations.

Referring now to FIG. 1 of the drawing, a protective cover indicated generally by the reference numeral 10 includes a sleeve 12. The illustrated sleeve is circular in cross section, although this is not essential, and it is formed from comparatively thin rubber or other resilient electrically insulating material. The walls of the sleeve are corrugated to give increased body to the thin material, see FIG. 5, and the walls include a straight longitudinal slot 14 extending between sleeve ends 16 and 18, see FIG. 3.

Enlarged annular flanges 20 and 22 of resilient material are formed on sleeve ends 16 and 18, and these flanges lie in planes transverse to the sleeve axis. As seen, slots 24 and 26 aligned with slot 14 are formed in flanges 20 and 22 for reasons to become apparent below.

Flanges 20 and 22 are eccentric with respect to the axis of sleeve 12, as shown in FIGS. 2, 4 and 6, and the flanges are positioned so each flange extends farthest above the walls or surface of sleeve 12 at a point diametrically opposite the slots. With this shape the resilient flanges tend to bias the edges of the slots together and help reduce concentrated strain in sleeve 12 caused by separation of the edges of the slots during installation of the protective cover.

End 18 of sleeve 12 has an enlarged circular opening 28 communicating with the sleeve interior for reasons to become apparent below, see FIG. 2. The other end 16 of the sleeve is provided with a concentric axially projecting tapering cone-like portion 30 which substantially closes that end of the sleeve. The small end of the cone-like portion merges into an axial tubular extension piece 32. This extension piece is concentric with sleeve 12.

Cone-like portion 30 and extension piece 32 are provided respectively with straight slots 34 and 36. As seen in FIG. 3, slots 14, 24, 26, 34 and 36 all are aligned with each other to provide continuous entrance to the interior of the protective cover. Thus, the cover can be fitted over a power line 38 to enclose same as shown in FIGS. 5 and 6.

Longitudinal lips 40, generally transverse to the surface of the sleeve 12 and to the surface of the cone-like portion 30, extend out from the edges of slots 14 and 34, see FIGS. 2, 4, 5 and 6. These lips have diverging ends so they define a converging entrance 42 to the space between the lips 40. This makes it easy to insert a power line between the lips 40 and through the entrance slots.

As seen in FIGS. 7 and 8, straight longitudinally extending rows of serrations 44 are disposed on the external surface of the extension piece 32. These serrations are adapted to extend inside of and grip a tubular insulating line cover 46, as shown in FIG. 5.

A longitudinally extending flange or lifting bar 48 is formed on sleeve 12 opposite lips 40. The ends of the lifting bar are connected with and are transverse to flanges 20 and 22. This flange 48, which imparts a degree of rigidity to the cover, has a centrally positioned opening 50 defining a handhold for manual manipulation of the sleeve. Smaller openings 52 may be provided in flange or bar 48 on each side of opening 50 if desired.

By forming the protective cover as described above, a cover two feet in length and a foot in diameter can be formed from insulating material only ⅛″ thick in sleeve 12. Such a cover is lightweight, easy to manipulate and large enough to enclose high voltage equipment such as dead end bells, pin and post type insulators and underslung or vertical disconnect switches. In addition, the protective cover is able to resist 30,000 volts for at least 3 minutes.

In operation, a "hot stick" applicator is applied to the lifting bar 48 and the converging entrance 42 between lips 40 is aligned with a high voltage line 38, as shown in FIGS. 1 and 2. Then the protective cover is moved upwardly (or downwardly) so the high voltage line or wire 38 is forced between lips 40 and through the entrance slots into the interior of the cover. In so doing, the lips 40 and the edges of slots 14, 24, 26, 34 and 36 momentarily separate. After the entrance of the wire 38, the resilience of the material causes the edges to return to initial position. The conical shape of portion 30 permits slot 34 in this portion of the cover to open and close with ease, a result which could not be achieved with a flat wall.

After line 38 passes into the interior of the cover, the cover is moved along the line until it encloses an electrical device such as dead end bells 54, see FIG. 6. As seen, the corrugated inner surface of sleeve 12 rests on the dead end bells 54 and the corrugated walls tend to prevent lengthwise movement of the sleeve due to dancing wire or pole vibration.

From the above description, it is thought that the construction and advantages of the invention will be readily apparent to those skilled in the art. Various changes in detail may be made without departing from the spirit or losing the advantages of the invention.

Having thus described the invention, what I claim as new and desire to secure by Letters Patent is:

1. A protective cover for electrical equipment on high voltage power lines comprising a tubular sleeve formed from an electrically insulating material, said sleeve having thin corrugated walls and provided with a straight slot extending between its ends, means integral with the sleeve ends biasing the edges of the slot together and an exterior longitudinal flange on said sleeve opposite said slot, said flange connected to and extending between said biasing means and serving to strengthen said sleeve, the interior dimension of said sleeve large enough so the sleeve can enclose electrical equipment commonly mounted on high voltage lines, one end of said sleeve having a large opening communicating with its interior whereby after said sleeve is forced against a high voltage line so the line passes through said slot into the sleeve interior, the sleeve can be shifted over the line until electrical equipment mounted on said line passes through said opening into the interior of the sleeve.

2. The protective cover described in claim 1 wherein lips generally transverse to said sleeve walls project out from the edges of said slot, said lips shaped to define a converging entrance to the slot to facilitate mounting the sleeve on the wire, said lips cooperating with said flange to further strengthen said sleeve.

3. A protective cover for electrical equipment comprising a tubular sleeve formed from a resilient electrically insulating material, said sleeve having thin corrugated walls and provided with a straight slot extending between its ends, an enlarged flange of resilient material formed on each end of said sleeve transverse to said sleeve axis, said flange slotted and the slots in each flange aligned with the slot in said sleeve, said flanges eccentric with respect to said sleeve and positioned so each flange extends farthest above the walls of the sleeve at a point opposite the slots whereby the resilient material forming the flanges helps bias the edges of the slots together and helps resist strain caused by separation of the edges of the slots from causing substantial changes in the electrical insulating properties of the cover, one end of said sleeve having a large opening communicating with the sleeve interior whereby after said sleeve is forced against a high voltage line so the line passes through said slot into the sleeve interior the sleeve can be shifted over the line until electrical equipment mounted on said line passes through said opening and into the interior of the protective cover.

4. The protective cover described in claim 3 wherein generally radially extending lips project outwardly from the edges of said slot defining a converging entrance thereto to facilitate mounting of the sleeve.

5. A protective cover for electrical equipment comprising a tubular sleeve formed from a resilient electrically insulating material, said sleeve having thin corrugated walls with a straight slot extending between its ends, an enlarged flange of resilient material formed on each end of said sleeve transverse to the sleeve axis, said flanges slotted and the slots in each flange aligned with the slot in said sleeve, said flanges eccentric with respect to said sleeve and positioned so each flange extends farthest above the surface of the walls at a point opposite the slots whereby the resilient material forming the flanges helps bias the edges of the slots together and helps resist strain caused by separation of the edges of the slot from causing substantial changes in the electrical insulating properties of the cover, one end of said sleeve having a large opening communicating with the sleeve interior whereby after said sleeve is forced against a high voltage line so the line is forced through the slot into the sleeve interior the sleeve can be shifted over the line until electrical equipment mounted on said line passes through said opening and into the interior of the sleeve, the other end of said sleeve provided with an axially projecting tapering cone-like portion concentric with said sleeve, said cone-like portion slotted and provided with an axially extending slotted extension piece concentric with said sleeve, said extension piece slotted and adapted to be connected to a tubular line cover, the slots in said sleeve, said cone-like portion and said extension piece aligned with each other to provide a continuous entrance to the interior of the cover whereby a straight power line can be forced against the slots and into the interior of the cover.

6. The protective cover described in claim 5 wherein lips project outwardly from the edges of the slots in said sleeve and said cone defining a converging entrance to the interior of the sleeve.

7. The protective cover described in claim 6 including a longitudinally extending flange on the walls of said sleeve, said flange connected with and transverse to said enlarged flanges to strengthen the sleeve, said flange having an opening extending therethrough defining a hand and instrument hold to facilitate manipulating the cover.

8. A protective cover for linemen comprising a tubular sleeve circular in cross section and formed from resilient electrically insulating material, said sleeve having thin corrugated walls and provided with a straight slot extending between its ends, an enlarged annular flange of resilient material formed on each end of said sleeve transverse to the sleeve axis, said flanges slotted and the slots in said flanges aligned with the slot in said sleeve, said flanges eccentric with respect to the axis of said sleeve and positioned so each flange extends farthest above the walls of the sleeve at a point diametrically opposite the slots whereby the resilient material forming the flanges helps bias the edges of the slots together and helps resist strain caused by separation of the edges of the slots from causing substantial changes in the electrical insulating properties of the sleeve, one end of said sleeve having a large opening communicating with the sleeve interior whereby after the sleeve is mounted on the power line it can be shifted over the power line until electrical equipment mounted on said power line passes through said opening into the sleeve interior, the other end of said sleeve provided with a concentric axially projecting tapering cone-like portion, said cone-like portion provided with a slot, the small end of said cone-like portion merging into an axially extending tubular extension piece concentric with said sleeve, said extension piece having a straight slot and an exterior surface serrated for gripping engagement with a tubular line cover, the slots in said sleeve, said cone-like portion and said extension piece aligned with each other to provide a continuous entrance to the interior of the sleeve whereby a straight power line can be moved through said slots.

9. The protective cover described in claim 8 wherein said sleeve is substantially two feet long and a foot in diameter and the walls of the sleeve are substantially one-eighth inch thick.

10. The protective cover described in claim 8 wherein generally transverse lips project out from the edges of the slots in said sleeve and said cone-like portion, said lips shaped so they define a converging entrance to the interior of the protective cover.

11. The protective cover described in claim 10 including a longitudinally extending flange on the walls of said sleeve, said flange connected with and transverse to said enlarged circular flanges to strengthen the protective cover and having an opening extending therethrough defining a hand hold to facilitate manipulating the cover.

References Cited in the file of this patent

UNITED STATES PATENTS

| | | |
|---|---|---|
| 1,988,435 | Beebe | Jan. 22, 1935 |

FOREIGN PATENTS

| | | |
|---|---|---|
| 505,013 | Great Britain | May 1, 1939 |
| 846,632 | France | June 12, 1939 |
| 836,903 | Great Britain | June 9, 1960 |